United States Patent
Ohnishi et al.

(10) Patent No.: US 12,014,112 B2
(45) Date of Patent: *Jun. 18, 2024

(54) CONTROL DEVICE, CONTROL METHOD, AND NON-TRANSITORY COMPUTER READABLE MEDIUM

(71) Applicant: KABUSHIKI KAISHA TOKAI RIKA DENKI SEISAKUSHO, Aichi (JP)

(72) Inventors: Takeshi Ohnishi, Aichi (JP); Fumiaki Hirose, Aichi (JP); Yuma Nakai, Aichi (JP)

(73) Assignee: KABUSHIKI KAISHA TOKAI RIKA DENKI SEISAKUSHO, Aichi (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/640,927

(22) PCT Filed: Apr. 17, 2020

(86) PCT No.: PCT/JP2020/016825
§ 371 (c)(1),
(2) Date: Mar. 7, 2022

(87) PCT Pub. No.: WO2021/049081
PCT Pub. Date: Mar. 18, 2021

(65) Prior Publication Data
US 2022/0334792 A1 Oct. 20, 2022

(30) Foreign Application Priority Data
Sep. 10, 2019 (JP) .................................. 2019-164226

(51) Int. Cl.
*G06F 3/16* (2006.01)
*G06F 3/01* (2006.01)
*H04R 3/00* (2006.01)

(52) U.S. Cl.
CPC .............. *G06F 3/165* (2013.01); *G06F 3/167* (2013.01); *H04R 3/00* (2013.01); *G06F 3/016* (2013.01); *H04R 2430/01* (2013.01)

(58) Field of Classification Search
CPC .............. G10K 11/1754; G10K 11/175; G10L 21/003; G10L 21/16; G10L 25/48;
(Continued)

(56) References Cited

U.S. PATENT DOCUMENTS 6,791,433 B1* 9/2004 Duerig .................... G10L 15/02
704/271
2010/0309142 A1* 12/2010 Cruz-Hernandez ..... G06F 3/041
345/173
(Continued)

FOREIGN PATENT DOCUMENTS

| JP | 2010-287231 | 12/2010 |
|---|---|---|
| JP | 2014-201300 | 10/2014 |
| JP | 2017-130030 | 7/2017 |

OTHER PUBLICATIONS

International Search Report issued in International Bureau of WIPO Patent Application No. PCT/JP2020/016825, dated Jul. 7, 2020.
(Continued)

*Primary Examiner* — Lun-See Lao
(74) *Attorney, Agent, or Firm* — GREENBLUM & BERNSTEIN P.L.C.

(57) ABSTRACT

A control device including a control section configured to cause a sound output section to output sound in a case where it is determined that an operation is performed on an input section by a target object coming into contact with a contact region, the input section having the contact region touched by the target object, wherein the control section adjusts a loudness peak as a control parameter for performing control in such a manner that the sound output section outputs the
(Continued)

sound, the loudness peak being a maximum value of loudness indicating intensity of the sound.

8 Claims, 5 Drawing Sheets

(58) Field of Classification Search
CPC ......... G10L 25/87; G10L 25/51; G10L 17/00;
G10L 2015/225; G10L 25/18; G10L
25/63; G10L 25/66; G10L 25/90; G10L
13/033; G10L 15/063; G10L 2015/0631;
G10L 2021/0135; G10L 2021/02082;
G10L 2021/03646; G10L 21/0208; G10L
21/0232; H04K 2203/12; H04K 3/41;
H04K 3/45; H04K 3/46; H04K 3/825;
H04K 3/84; H04L 1/00; H04L 25/4908;
H04L 67/04; H04L 67/12; H04L 67/131;
H04L 67/535; H04R 3/12; H04R 1/10;
H04R 2420/07; H04R 2420/09; H04R
3/00; H04R 3/04; H04R 5/033; H04R
2227/007; H04R 2410/05; H04R 2430/01;
H04R 2430/03; H04R 25/502; H04R
25/505; H04R 25/606; H04R 25/70;
H04R 3/005; H04N 21/4263; H04N
21/4345; H04N 21/439; H04N 21/44222;
H04N 21/84; H04N 23/45; H04N 5/445;
H04N 5/60; H04W 4/33; H04W 4/35;
H04W 4/38
USPC ...................................... 381/104–107; 700/94
See application file for complete search history.

(56) References Cited

U.S. PATENT DOCUMENTS

| | | | |
|---|---|---|---|
| 2014/0309549 A1* | 10/2014 | Selig | A61B 5/123 600/559 |
| 2016/0211821 A1* | 7/2016 | Grosche | H03G 7/002 |
| 2017/0208195 A1 | 7/2017 | Yamamoto et al. | |
| 2020/0079400 A1* | 3/2020 | Ueno | B60R 16/02 |
| 2020/0309142 A1* | 10/2020 | Steiner | F04D 27/0246 |
| 2022/0334665 A1* | 10/2022 | Ohnishi | H04R 3/04 |

OTHER PUBLICATIONS

Written Opinion issued in International Bureau of WIPO Patent Application No. PCT/JP2020/016825, dated Jul. 7, 2020.

* cited by examiner

FIG. 4

CONTROL DEVICE, CONTROL METHOD, AND NON-TRANSITORY COMPUTER READABLE MEDIUM

TECHNICAL FIELD

The present invention relates to a control device, a control method, and a non-transitory computer readable medium.

BACKGROUND ART

In recent years, technologies of outputting feedback in response to a user operation have been considered. For example, Patent Literature 1 listed below discloses a technology of giving tactile feedback to a user by vibrating an operation receiver in the case where the user has pressed the operation receiver.

CITATION LIST

Patent Literature

Patent Literature 1: JP 2010-287231A

DISCLOSURE OF INVENTION

Technical Problem

However, according to the technology disclosed in the above Patent Literature 1, the mere vibration is given as the feedback. Therefore, the feedback has no meaning other than informing the user whether or not the user operation has been accepted.

Accordingly, the present invention is made in view of the aforementioned issues, and an object of the present invention is to provide a mechanism that makes it possible to improve expressiveness of the feedback.

Solution to Problem

To solve the above described problem, according to an aspect of the present invention, there is provided a control device comprising a control section configured to cause a sound output section to output sound in a case where it is determined that an operation is performed on an input section by a target object coming into contact with a contact region, the input section having the contact region touched by the target object, wherein the control section adjusts a loudness peak as a control parameter for performing control in such a manner that the sound output section outputs the sound, the loudness peak being a maximum value of loudness indicating intensity of the sound.

To solve the above described problem, according to another aspect of the present invention, there is provided a control method comprising causing a sound output section to output sound in a case where it is determined that an operation is performed on an input section by a target object coming into contact with a contact region, the input section having the contact region touched by the target object, wherein the output of sound from the sound output section includes adjustment of a loudness peak as a control parameter for performing control in such a manner that the sound output section outputs the sound, the loudness peak being a maximum value of loudness indicating intensity of the sound.

To solve the above described problem, according to another aspect of the present invention, there is provided a non-transitory computer readable medium having a program stored therein, the program causing a computer to function as a control section configured to cause a sound output section to output sound in a case where it is determined that an operation is performed on an input section by a target object coming into contact with a contact region, the input section having the contact region touched by the target object, wherein the control section adjusts a loudness peak as a control parameter for performing control in such a manner that the sound output section outputs the sound, the loudness peak being a maximum value of loudness indicating intensity of the sound.

Advantageous Effects of Invention

As described above, according to the present invention, it is possible to provide the mechanism that makes it possible to improve expressiveness of feedback.

MODE(S) FOR CARRYING OUT THE INVENTION

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

1. Configuration Example

Figure 1:
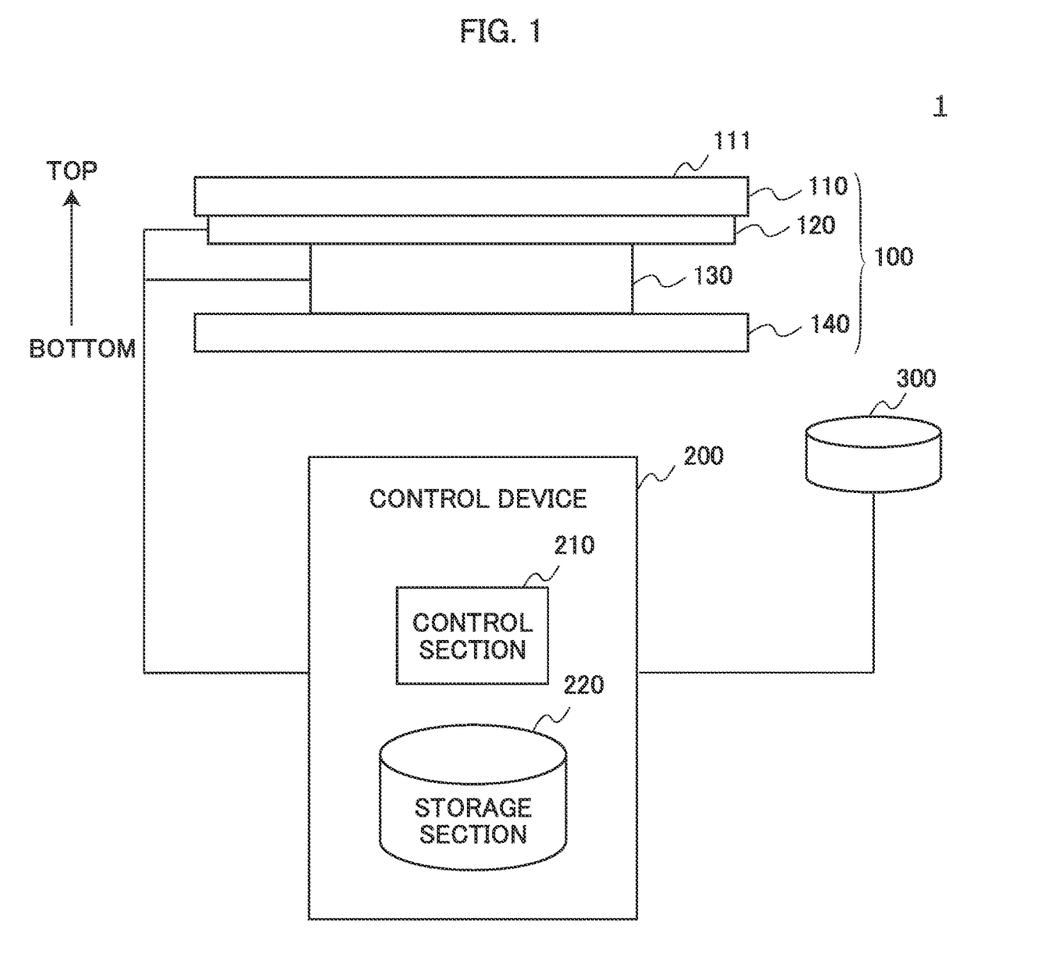
FIG. 1 is a diagram illustrating an example of configuration of a system according to an embodiment of the present disclosure.

FIG. 1 is a diagram illustrating an example of configuration of a system 1 according to an embodiment of the present disclosure. As illustrated in FIG. 1, the system 1 according to the present embodiment includes an input device 100, a control device 200, and a sound output device 300. In particular, FIG. 1 illustrates the input device 100 as a cross-sectional view. In addition, FIG. 1 illustrates the control device 200 as a block diagram.

(1) Input Device 100

The input device 100 is a device configured to receive an operation performed by a target object through contact. The target object is any object configured to input information by operating the input device 100. Examples of the target object include a finger of a user, a palm of a hand, various object held in the user's hand, and the like. Examples of the operation performed by a target object through contact include a press operation, which is an operation of pressing a contact region 111 on the operation reception section 110

(to be described later). The input device 100 is an example of an input section according to the present invention.

As illustrated in FIG. 1, the input device 100 includes the operation reception section 110, a detection section 120, an actuator 130, and a supporting material 140. In addition, as illustrated in FIG. 1, the operation reception section 110, the detection section 120, the actuator 130, and the supporting material 140 are provided in this order in one direction. With regard to the one direction, the side of the operation reception section 110 is also referred to as an upper side, and the side of the supporting material 140 is also referred to as a lower side.

The operation reception section 110 is a member configured to receive an operation performed by the target object through contact. The operation reception section 110 has a contact region 111 with which the target object comes into contact. The contact region 111 is a region with which the target object comes into contact.

According to the present embodiment, the operation reception section 110 may be configured as a touchscreen. In this case, the contact region 111 may have any shape such as a rectangular shape, a circular shape, or a rounded-corner box shape when viewed from above. Note that, the operation reception section 110 is not limited to the touchscreen as long as the operation reception section 110 is a member configured to receive the operation performed by the target object through contact. The operation reception section 110 may be configured as various kinds of button, various kinds of knobs, various kinds of levers, or the like as long as it receives the operation.

The detection section 120 is a sensor configured to output an index for detecting the operation performed via the operation reception section 110. For example, the detection section 120 according to the present embodiment may be a pressure-sensitive sensor configured to detect a pressure on the operation reception section 110. In addition, the detection section 120 transmits sensor information to the control device 200. The sensor information indicates the detected pressure.

Note that, the detection section 120 according to the present invention is not limited to the pressure-sensitive sensor. The detection section 120 may be a force sensor configured to detect and output a force applied to the operation reception section 100 or a load sensor configured to detect and output a load applied to the operation reception section 110 as long as the sensor is able to output an index for detecting an operation performed via the operation reception section 110. In addition, the detection section 120 may be a contact point of braking a conductive wire when the operation reception section 110 is operated.

The actuator 130 vibrates under the control of the control device 200. For example, the actuator 130 includes a linear motor actuator, a voice coil motor, and the like.

Here, the operation reception section 110, the detection section 120, and the actuator 130 are connected. Therefore, when the actuator 130 vibrates, the operation reception section 110 also vibrates in conjunction with the actuator 130.

The supporting material 140 is a member that supports structural elements of the input device 100. The supporting material 140 supports the actuator 130.

(2) Sound Output Device 300

The sound output device 300 is a device configured to output sound. The sound output device 300 outputs the sound under the control of the control device 200. The sound output device 300 is disposed in such a manner that the sound output device 300 is capable of outputting the sound to a user who is operating the input device 100. For example, the sound output device 300 may be disposed near the input device 100, or may be disposed near an ear of the user. For example, the sound output device 300 includes a speaker, a headphone, and the like. The sound output device 300 is an example of a sound output section according to the present invention.

(3) Control Device 200

The control device 200 is a device configured to control overall operation of the system 1. As illustrated in FIG. 1, the control device 200 includes a control section 210 and a storage section 220.

The storage section 220 has a function of storing various kinds of information for operation performed by the control device 200. For example, the storage section 220 stores various kinds of criterion values of control parameters (to be described later). For example, the storage section 220 includes any storage medium such as flash memory and a read/write device configured to read and write information from and to the storage medium.

The control section 210 controls overall operation of the system 1. For example, the control section 210 is implemented by an electronic circuit such as a central processing unit (CPU), a microprocessing unit (MPU), and an electronic control unit (ECU). For example, the control section 210 causes the sound output device 300 to output sound on the basis of sensor information received from the detection section 120. Specifically, the control section 210 first determines whether or not an operation has been performed on the operation reception section 110 by the target object coming into contact with the contact region 111, on the basis of the sensor information. For example, the control section 210 determines that the operation has been performed in the case where a pressure detected by the detection section 120 exceeds a predetermined threshold. Alternatively, the control section 210 determines that the operation has not been performed in the case where the pressure detected by the detection section 120 does not exceed the predetermined threshold. Next, the control section 210 causes the sound output device 300 to output sound in the case where it is determined that the operation has been performed on the operation reception section 110 by the target object through contact. This allows the user to receive sound feedback when operating the operation reception section 110 through contact.

In addition, the control section 210 may vibrate the operation reception section 110 (more specifically, the contact region 111) by vibrating the actuator 130 in the case where it is determined that the operation has been performed on the operation reception section 110 by the target object through contact. This allows the user to receive vibration feedback when operating the operation reception section 110 through contact.

2. Technical Features

The control section 210 adjusts the control parameters for performing control in such a manner that the sound output device 300 outputs sound. The control parameters are values that define the sound to be output from the sound output device 300. For example, the parameters that define the sound include a parameter related to frequency, a parameter related to sound volume, and the like. The control section 210 generates a signal for outputting sound based on the adjusted control parameters to the sound output device 300, and inputs the generated signal to the sound output device 300. This allows the sound output device 300 to output the sound based on the adjusted control parameters. In addition, by adjusting the control parameters, it is possible to create various sensations. In other words, appropriate adjustment of the control parameters allows the user to perceive a desired sensation. This makes it possible to improve expressiveness of the feedback. Details of the adjustment of the control parameters and the creation of various sensations will be described with reference to FIG. 2.

Figure 2:
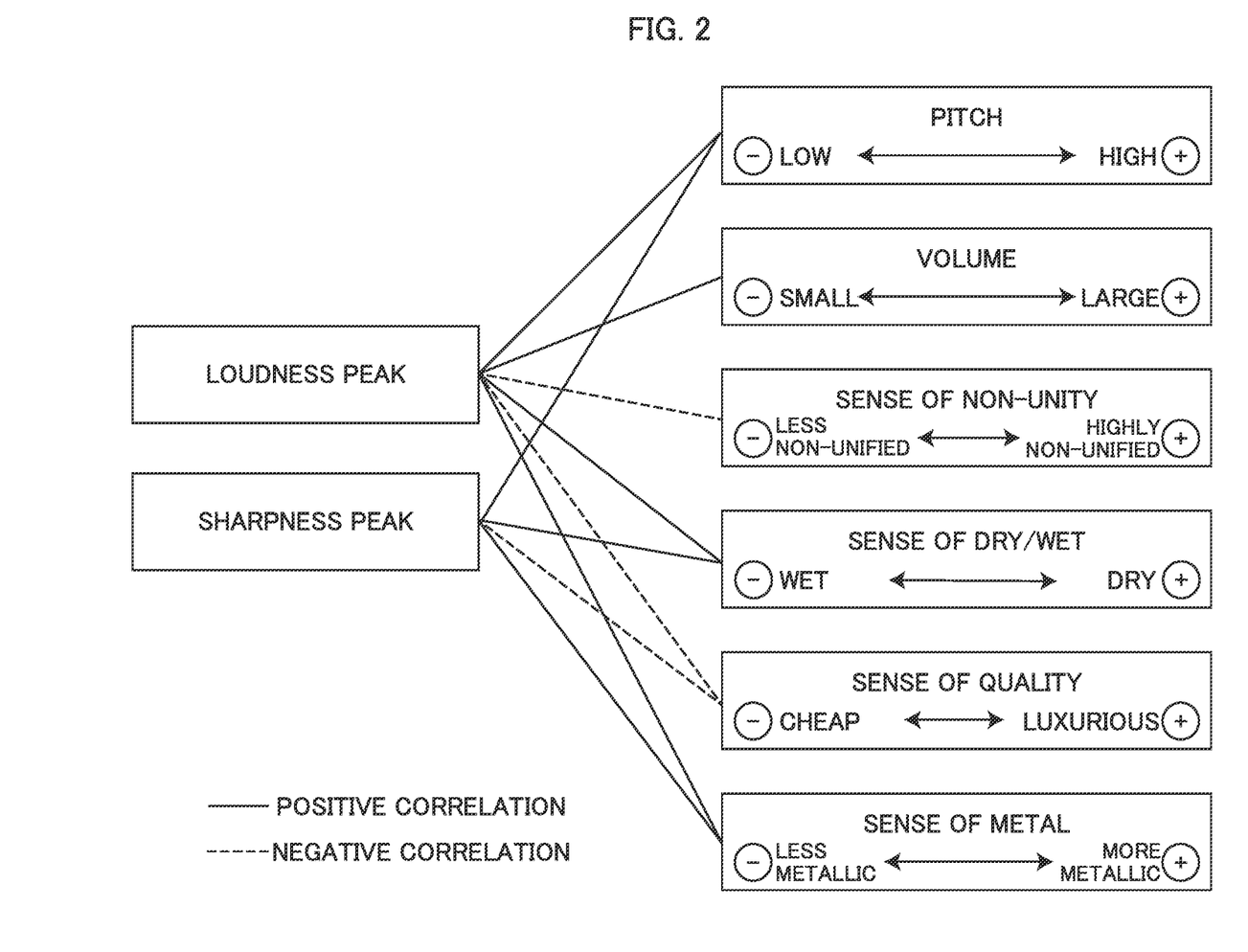
FIG. 2 is a diagram illustrating an example of relationship between control parameters and sensations created by adjusting the control parameters according to the embodiment.

FIG. 2 is a diagram illustrating an example of relationship between the control parameters and the sensations created by adjusting the control parameters according to the present embodiment. The control parameters are illustrated in the left side of FIG. 2, and the sensations are illustrated in the right side of FIG. 2. The relationship illustrated in FIG. 2 is revealed by experiments made by the present inventors. The present inventors made the experiments in which, when the control parameters were changed, the user performed the press operation on the input device 100, received feedback, and then answers which sensation the user perceived. In addition, the present inventors carried out a correlation analysis with regard to combinations of the control parameters and the sensations on the basis of results of the experiments on a plurality of users.

In FIG. 2, combinations of control parameters and sensations connected through solid line links each have positive correlation in which a correlation coefficient greater than or equal to a first threshold value is calculated. In other words, when a control parameter changes in a positive direction, a sensation connected to the control parameter through a solid line link also changes in the positive direction. Here, the change in the control parameter in the positive direction means increase in a value of the control parameter. In addition, the change in the sensation in the positive direction means increase in the sensation to be perceived by the user. On the other hand, when a control parameter changes in a negative direction, a sensation connected to the control parameter through a solid line link also changes in the negative direction. Here, the change in the control parameter in the negative direction means decrease in a value of the control parameter. In addition, the change in the sensation in the negative direction means decrease in the sensation to be perceived by the user. Note that, for example, the first threshold may be 0.6.

In FIG. 2, combinations of control parameters and sensations connected through dashed line links each have negative correlation in which a correlation coefficient less than or equal to a second threshold value is calculated. In other words, when a control parameter changes in the positive direction, a sensation connected to the control parameter through a dashed line link changes in the negative direction. On the other hand, when a control parameter changes in the negative direction, a sensation connected to the control parameter through a dashed line link changes in the positive direction. Note that, for example, the second threshold may be −0.6.

(1) Created Sensations

As illustrated in FIG. 2, the created sensations include pitch, volume, sense of non-unity, sense of dry/wet, sense of quality, and sense of metal. Next, details of the respective sensations will be described.

The "pitch (tune)" indicates pitch of sound to be perceived by a human. In the case of high pitch, the human perceives high-pitched sound. In the case of low pitch, the human perceives low-pitched sound. Here, the change of the pitch in the positive direction means that the user perceives higher pitched sound than the sensation before change. The change of the pitch in the negative direction means that the user perceives lower pitched sound than the sensation before change.

The "volume (size)" indicates volume of sound to be perceived by the human. In the case of high volume, the human perceives high-volume sound. In the case of low volume, the human perceives low-volume sound. Here, the change of the volume in the positive direction means that the user perceives higher volume sound than the sensation before change. The change of the volume in the negative direction means that the user perceives lower volume sound than the sensation before change.

The "sense of non-unity" indicates a degree of sensitivity to other sound than target sound. In the case of high sense of non-unity, the human is likely to perceive the other sound than the target sound. In the case of low sense of non-unity, the human is not likely to perceive the other sound than the target sound. Here, the change of the sense of non-unity in the positive direction means that the user perceives highly sense of non-unity than the sensation before change. The change of the sense of non-unity in the negative direction means that the user perceives less sense of non-unity than the sensation before change.

The "sense of dry/wet" indicates a sensation of smooth following with regard to a degree of following after an operation. In addition, the "sense of dry/wet" indicates a sensation related to a metaphor of water content such as dry sound and wet sound, which are evoked by hardness, volume, pitch, and the like of the sound. In the case of dry sound, the human perceives a decreased sensation of smooth following with regard to the degree of following after the operation. In the case of wet sound, the human perceives an increased sensation of smooth following with regard to the degree of following after the operation. Here, the change of the "sense of dry/wet" in the positive direction means that the user perceives drier than the sensation before change. The change of the "sense of dry/wet" in the negative direction means that the user perceives wetter than the sensation before change.

The "sense of quality" indicates a sensation of boldness, mellowness, and presence. In the case of sense of luxury, the human perceives the sensation of boldness, mellowness, and presence. In the case of sense of cheapness, the human perceives the sensation of frivolousness, harshness, and absence. Here, the change of the sense of quality in the positive direction means that the user perceives more luxurious than the sensation before change. The change of the sense of quality in the negative direction means that the user perceives cheaper than the sensation before change.

The "sense of metal" indicates a sensation of heavy, small, high, and oneness. In the case of the sense of metal, the human perceives the sensation of heavy, small, high, and oneness. In the case of sense of non-metal, the human perceives sensation of flippancy, loud, low, and lack of oneness. Here, the change of the sense of metal in the positive direction means that the user perceives more metallic than the sensation before change. The change of the sense of metal in the negative direction means that the user perceives less metallic than the sensation before change.

(2) Adjustment of Control Parameters

Examples of the control parameters to be adjusted include a loudness peak. In the present embodiment, a sharpness peak may be used as the control parameter to be adjusted in addition to the loudness peak. Next, details of adjustment of the respective control parameters will be described.

Loudness Peak

The loudness peak is a maximum value of loudness indicating intensity of sound. The loudness is an index indicating the intensity of sound. In particular, the loudness is an index indicating intensity of sound to be perceived by humans. Typically, "sone" is a unit of loudness. For example, 1 sone is equivalent to intensity of a pure tone of 1000 Hz at 40 dB sound pressure level. Note that, the loudness peak may be a local maximum value of loudness. Details the loudness peak will be described with reference to FIG. 3.

Figure 3:
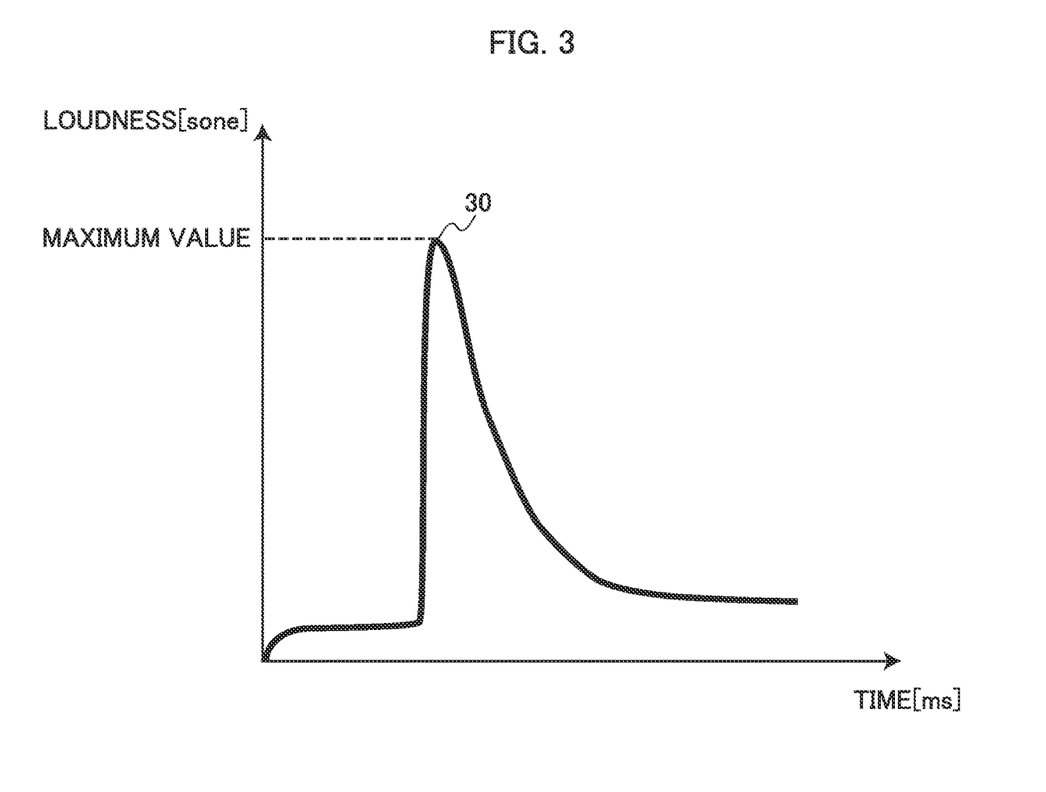
FIG. 3 is a diagram for describing an example of a control parameter according to the embodiment.

FIG. 3 is a diagram for describing an example of the control parameter according to the present embodiment. FIG. 3 includes a vertical axis representing the loudness. The sone is used as a unit of loudness. FIG. 3 also includes a horizontal axis representing time. "Millisecond" is used as a unit of the time. FIG. 3 illustrates chronological change in loudness of sound output as feedback. As illustrated in FIG. 3, a loudness peak 30 is a maximum value of the loudness.

The control section 210 adjusts the loudness peak. This makes it possible to adjust sensations to be perceived by a user such as the pitch, volume, sense of non-unity, sense of dry/wet, sense of quality, and sense of metal as illustrated in FIG. 2. As illustrated in FIG. 2, the loudness peak has positive correlation with the pitch, volume, sense of dry/wet, and sense of metal. Therefore, by adjusting the loudness peak toward the positive direction, it is possible to change these sensations in the positive direction. Alternatively, by adjusting the loudness peak toward the negative direction, it is possible to change these sensations in the negative direction. In addition, as illustrated in FIG. 2, the loudness peak has negative correlation with the sense of non-unity and sense of quality. Therefore, by adjusting the loudness peak toward the positive direction, it is possible to change these sensations in the negative direction. Alternatively, by adjusting the loudness peak toward the negative direction, it is possible to change these sensations in the positive direction.

For example, the control section 210 may adjust the loudness peak in such a manner that the loudness peak exceeds a first criterion value. The first criterion value is a loudness peak where sound output from the sound output device 300 is imperceptible. For example, the first criterion value may be 0. The user perceives stronger sound as the loudness peak increases. Therefore, it is possible for the user to perceive the sound more easily. In addition, as illustrated in FIG. 2, it is possible to cause the user to perceive higher, louder, less non-unified, dryer, cheaper, and more metallic than unadjusted sound though the above-described adjustment. Alternatively, the first criterion value may be a loudness peak where sound output from the sound output device 300 is perceptible. In this case, it is possible for the user to perceive both unadjusted sound and adjusted sound. Therefore, it is possible to cause the user to clearly perceive change in sensations caused by the adjustment.

Note that, as the first criterion value, it is also possible to use a loudness peak obtained before the adjustment. In this case, it is possible to more flexibly perform control and cause the user to perceive the higher, louder, less non-unified, dryer, cheaper, and more metallic by adjusting the loudness peak in such a manner that the loudness peak exceeds the first criterion value.

For another example, the control section 210 may adjust the loudness peak in such a manner that the loudness peak becomes less than a second criterion value. The second criterion value is a loudness peak where sound output from the sound output device 300 is perceptible. For example, the second criterion value may be infinity. The user perceives weaker sound as the loudness peak decreases. Therefore, the user becomes less likely to perceive the sound. In addition, as illustrated in FIG. 2, it is possible to cause the user to perceive lower, smaller, more non-unified, wetter, more luxurious, and less metallic than unadjusted sound though the above-described adjustment.

Note that, as the second criterion value, it is also possible to use a loudness peak obtained before the adjustment. In this case, it is possible to more flexibly perform control and cause the user to perceive the lower, smaller, more non-unified, wetter, more luxurious, and less metallic by adjusting the loudness peak in such a manner that the loudness peak becomes less than the second criterion value.

Here, the loudness peak is adjusted by adjusting the loudness. In addition, the loudness is adjusted by changing the intensity of sound. For example, the adjustment for increasing the loudness is achieved by increasing intensity of sound of frequency that falls within a human hearing range. In addition, the adjustment for increasing the loudness may be achieved by increasing intensity of sound of frequency that is easily heard by humans. In addition, for example, the adjustment for decreasing the loudness is achieved by decreasing intensity of sound of frequency that falls within the human hearing range. For example, the adjustment for decreasing the loudness may be achieved by decreasing intensity of sound of frequency that is easily heard by humans.

Sharpness Peak

The sharpness peak is a maximum value of sharpness indicating sharpness of sound. The sharpness is an index indicating the sharpness of sound. In particular, the sharpness is an index indicating sharpness of sound to be perceived by humans. Typically, "acum" is a unit of sharpness. For example, 1 acum is equivalent to sharpness of a narrow-band Noise centered on 1 kHz at 60 dB sound pressure level. Note that, the sharpness peak may be a local maximum value of sharpness. Details the sharpness peak will be described with reference to FIG. 4.

Figure 4:
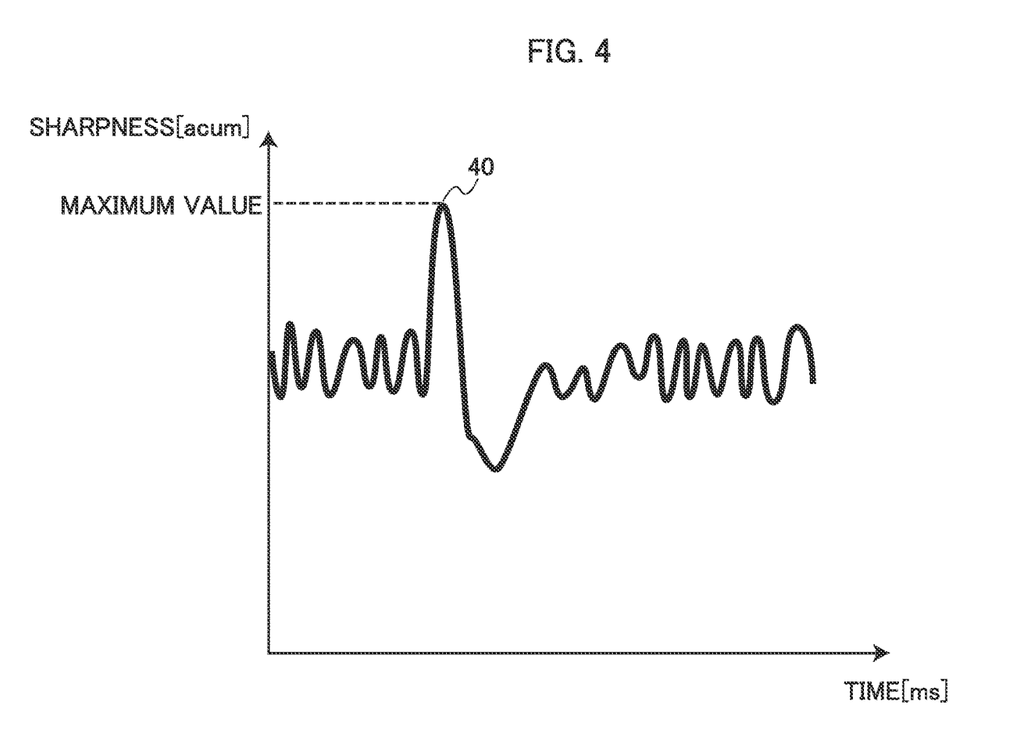
FIG. 4 is a diagram for describing an example of a control parameter according to the embodiment.

FIG. 4 is a diagram for describing an example of the control parameter according to the present embodiment. FIG. 4 includes a vertical axis representing the sharpness. The acum is used as a unit of the sharpness. FIG. 4 also includes a horizontal axis representing time. The "millisecond" is used as a unit of the time. FIG. 4 illustrates chronological change in sharpness of sound output as feedback. As illustrated in FIG. 4, a sharpness peak 40 is a maximum value of the sharpness.

The control section 210 adjusts the sharpness peak. This makes it possible to adjust sensations to be perceived by a user such as the pitch, sense of dry/wet, sense of quality, and sense of metal as illustrated in FIG. 2. As illustrated in FIG. 2, the sharpness peak has positive correlation with the pitch, sense of dry/wet, and sense of metal. Therefore, by adjusting the sharpness peak toward the positive direction, it is possible to change these sensations in the positive direction. Alternatively, by adjusting the sharpness peak toward the negative direction, it is possible to change these sensations in the negative direction. In addition, as illustrated in FIG. 2, the sharpness peak has negative correlation with the sense of quality. Therefore, by adjusting the sharpness peak toward the positive direction, it is possible to change this sensation in the negative direction. Alternatively, by adjusting the sharpness peak toward the negative direction, it is possible to change this sensation in the positive direction.

For example, the control section 210 may adjust the sharpness peak in such a manner that the sharpness peak exceeds a third criterion value. The third criterion value is a low sharpness peak where sound output from the sound output device 300 is imperceptible. Note that, it is considered that in the case where the sharpness peak is too low, the frequency of the output sound falls below a lower limit of the human hearing range and humans become unable to perceive sound. For example, the third criterion value may be 0. As illustrated in FIG. 2, it is possible to cause the user to perceive higher, dryer, cheaper, and more metallic than unadjusted sound though the above-described adjustment. Alternatively, the third criterion value may be a sharpness peak where sound output from the sound output device 300 is perceptible. In this case, it is possible for the user to perceive both unadjusted sound and adjusted sound. Therefore, it is possible to cause the user to clearly perceive change in sensations caused by the adjustment.

Note that, as the third criterion value, it is also possible to use a sharpness peak obtained before the adjustment. In this case, it is possible to more flexibly perform control and cause the user to perceive the higher, dryer, cheaper, and more metallic by adjusting the sharpness peak in such a manner that the sharpness peak exceeds the third criterion value.

For example, the control section 210 may adjust the sharpness peak in such a manner that the sharpness peak becomes less than a fourth criterion value. The fourth criterion value is a high sharpness peak where sound output from the sound output device 300 is imperceptible. Note that, it is considered that in the case where the sharpness peak is too high, the frequency of the output sound exceeds an upper limit of the human hearing range and humans become unable to perceive sound. For example, the fourth criterion value may be infinity. As illustrated in FIG. 2, it is possible to cause the user to perceive lower, wetter, more luxurious, and less metallic than unadjusted sound though the above-described adjustment. Alternatively, the fourth criterion value may be a sharpness peak where sound output from the sound output device 300 is perceptible. In this case, it is possible for the user to perceive both unadjusted sound and adjusted sound. Therefore, it is possible to cause the user to clearly perceive change in sensations caused by the adjustment.

Note that, as the fourth criterion value, it is also possible to use a sharpness peak obtained before the adjustment. In this case, it is possible to more flexibly perform control and cause the user to perceive the lower, wetter, more luxurious, and less metallic by adjusting the sharpness peak in such a manner that the sharpness peak becomes less than the fourth criterion value.

Here, the sharpness peak may be adjusted by adjusting the sharpness. In addition, the sharpness is adjusted by changing at least any of the volume or frequency of sound. For example, the adjustment for increasing the sharpness may be achieved by increasing the frequency of sound output from the sound output device 300 and/or by increasing the volume of sound of high frequency than the volume of sound of low frequency. In addition, for example, the adjustment for decreasing the sharpness may be achieved by decreasing the frequency of sound output from the sound output device 300 and/or by increasing the volume of sound of low frequency than the volume of sound of high frequency.

Note that, the sharpness may be an index indicating change in sound within a certain time range. In this case, the sharpness is adjusted by changing at least any of the volume or frequency of sound within the certain time range. For example, the control section 210 may adjust the sharpness by rapidly changing the frequency but slowly changing the volume of the sound. For another example, the control section 210 may adjust the sharpness by slowly changing the frequency but rapidly changing the volume of the sound.

(3) Combination of Adjustments of Control Parameters

The control section 210 adjusts the loudness peak as a control parameter. In addition, the control section 210 may adjust another control parameter in addition to the loudness peak.

For example, the control section 210 may adjust the sharpness peak and the loudness peak. As illustrated in FIG. 2, the sharpness peak is in common with the loudness peak in that the sharpness peak and the loudness peak are connected to the pitch, sense of dry/wet, sense of quality, and sense of metal through links. In addition, the direction (positive or negative direction) of the correlation between the sharpness peak and sensations connected to the sharpness peak through links is the same as the direction (positive or negative direction) of the correlation between the loudness peak and sensations connected to the loudness peak through links. These sensations are common to the sharpness peak and the loudness peak. Therefore, in the case of adjusting both the sharpness peak and the loudness peak, the control section 210 changes the sharpness peak and the loudness peak in a same direction (positive or negative direction). This makes it possible to enhance the change in the sensations in the positive direction or the negative direction. The sensations are common to the sharpness peak and the loudness peak and are connected to the sharpness peak and the loudness peak through links.

Specifically, the control section 210 adjusts the sharpness peak in such a manner that the sharpness peak exceeds the third criterion value in the case of adjusting the loudness peak in such a manner that the loudness peak exceeds the first criterion value. This makes it possible to cause the user to perceive sensations such as sensations of higher, dryer, cheaper, and more metallic more strongly than the case of adjusting the loudness peak or the sharpness peak alone. On the other hand, the control section 210 adjusts the sharpness peak in such a manner that the sharpness peak becomes less than the fourth criterion value in the case of adjusting the loudness peak in such a manner that the loudness peak becomes less than the second criterion value. This makes it possible to cause the user to perceive sensations such as sensations of lower, wetter, more luxurious, and less metallic more strongly than the case of adjusting the loudness peak or the sharpness peak alone.

(4) Flow of Process

Figure 5:
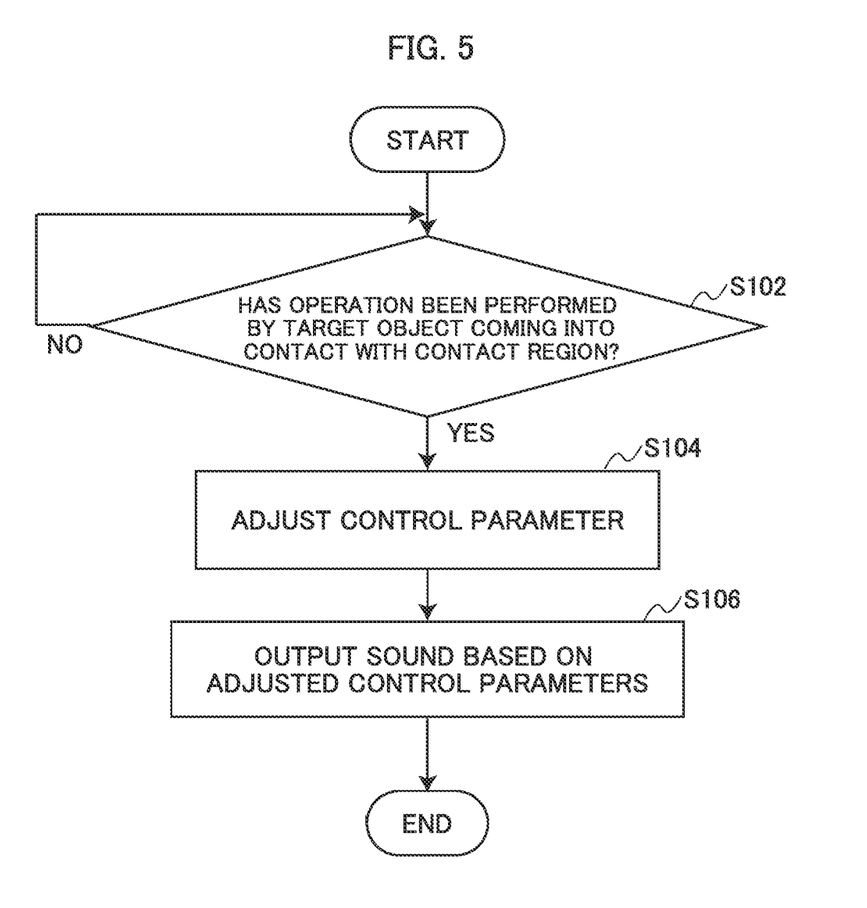
FIG. 5 is a flowchart illustrating an example of a flow of a feedback process executed by the system according to the embodiment.

Next, with reference to FIG. 5, a flow of a feedback process according to the present embodiment will be described. FIG. 5 is a flowchart illustrating an example of a flow of a feedback process executed by the system 1 according to the present embodiment.

As illustrated in FIG. 5, the control section 210 first determines whether or not an operation has been performed by the target object coming into contact with the contact region 111 (Step S102). In the case where it is determined that the operation has not been performed (NO in Step S102), the process returns to Step S102. On the other hand, in the case where it is determined that the operation has been performed (YES in Step S102), the process proceeds to Step S104.

In Step S104, the control section 210 adjusts the control parameter. Specifically, the control section 210 adjusts the loudness peak. At this time, the control section 210 may adjust both the sharpness peak and the loudness peak. Next, the control section 210 causes the sound output device 300 to output sound based on the adjusted control parameters (Step S106).

3. Supplement

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

For example, the above embodiment has been described on the assumption that the control parameter is a value that defines the sound to be output from the sound output device 300. However, the present invention is not limited thereto. For example, as the control parameter, it is possible to adjust a function for outputting the value that defines the sound to be output from the sound output device 300.

For example, the above embodiment has been described on the assumption that it is determined whether an operation has been performed on the basis of a pressure detected by the detection section 120. However, the present invention is not limited thereto. For example, the operation reception section 110 may have a function of detecting coordinates of a contact position of the target object in the contact region 111. In this case, it is determined whether an operation has been performed on the basis of whether or not the coordinates of the contact position of the target object has been detected in the contact region 111.

For example, the above embodiment has been described on the assumption that the operation performed by the target object is the press operation. However, the present invention is not limited thereto. For example, the operation reception section 110 may have a function of detecting coordinates of a contact position of the target object in the contact region 111. Next, the operation performed by the target object may be a touch operation performed by the target object coming into contact with the contact region 111, or may be a slide operation performed by the target object moving in the contact region 111 while being in contact with the contact region 111.

Note that, the various kinds of criterion values used for adjusting the control parameters may be fixed or variable. For example, the criterion values may change over time. As an example, a criterion value may be a value of the control parameter decided during last adjustment. In this case, it is possible to cause the user to perceive sensations having different intensity from last adjustment.

Note that, a series of processes performed by the devices described in this specification may be achieved by any of software, hardware, and a combination of software and hardware. A program that configures software is stored in advance in, for example, a recording medium (non-transitory medium) installed inside or outside the devices. In addition, for example, when a computer executes the programs, the programs are read into random access memory (RAM), and executed by a processor such as a CPU. The recording medium may be a magnetic disk, an optical disc, a magneto-optical disc, flash memory, or the like. Alternatively, the above-described computer program may be distributed via a network without using the recording medium, for example.

Further, in the present specification, the processes described using the flowcharts are not necessarily executed in the order illustrated in the drawings. Some processing steps may be executed in parallel. In addition, additional processing steps may be employed and some processing steps may be omitted.

REFERENCE SIGNS LIST

1 system
100 system
110 operation reception section
120 detection section
130 actuator
140 supporting material
200 control device
210 control section
220 storage section
300 sound output device

The invention claimed is:

1. A control device comprising
   a control section configured to cause a sound output section to output sound in a case where it is determined that an operation is performed on an input section by a target object coming into contact with a contact region, the input section having the contact region touched by the target object,
   wherein the control section adjusts a loudness peak as a control parameter for performing control in such a manner that the sound output section outputs the sound, the loudness peak being a maximum value of loudness indicating intensity of the sound,
   wherein the control section adjusts the loudness peak by adjusting a frequency of the sound output by the sound output section, and
   wherein
      the control section adjusts the loudness peak and a sharpness peak as control parameters,
      the sharpness peak is a maximum value of sharpness indicating sharpness of the sound,
      an adjustment for increasing the loudness is achieved by increasing intensity of sound of frequency that falls within a human hearing range, and
      an adjustment for decreasing the loudness is achieved by decreasing the intensity of sound of frequency that falls within the human hearing range.

2. The control device according to claim 1, wherein
   the control section adjusts the loudness peak in such a manner that the loudness peak exceeds a first criterion value, and
   the first criterion value is the loudness peak where the sound output from the sound output section is imperceptible.

3. The control device according to claim 1, wherein
   the control section adjusts the loudness peak in such a manner that the loudness peak becomes less than a second criterion value, and
   the second criterion value is the loudness peak where the sound output from the sound output section is perceptible.

4. The control device according to claim 1, wherein
   the control section adjusts the sharpness peak in such a manner that the sharpness peak exceeds a third criterion value in a case of adjusting the loudness peak in such a manner that the loudness peak exceeds a first criterion value,
   the first criterion value is the loudness peak where the sound output from the sound output section is imperceptible, and
   the third criterion value is the low sharpness peak where the sound output from the sound output section is imperceptible.

5. The control device according to claim 1, wherein
   the control section adjusts the sharpness peak in such a manner that the sharpness peak becomes less than a fourth criterion value in a case of adjusting the loudness peak in such a manner that the loudness peak becomes less than a second criterion value, the second criterion value is the loudness peak where the sound output from the sound output section is perceptible, and the fourth criterion value is the large sharpness peak where the sound output from the sound output section is imperceptible.

6. The control device according to claim 1, wherein the loudness indicates intensity of the sound perceived by a human.

7. A control method comprising causing a sound output section to output sound in a case where it is determined that an operation is performed on an input section by a target object coming into contact with a contact region, the input section having the contact region touched by the target object, wherein the output of sound from the sound output section includes adjustment of a loudness peak as a control parameter for performing control in such a manner that the sound output section outputs the sound, the loudness peak being a maximum value of loudness indicating intensity of the sound, wherein the adjustment of the loudness peak includes an adjustment to a frequency of the sound output by the sound output section, and wherein
 a control section adjusts the loudness peak and a sharpness peak as control parameters,
 the sharpness peak is a maximum value of sharpness indicating sharpness of the sound,
 an adjustment for increasing the loudness is achieved by increasing intensity of sound of frequency that falls within a human hearing range, and
 an adjustment for decreasing the loudness is achieved by decreasing the intensity of sound of frequency that falls within the human hearing range.

8. A non-transitory computer readable medium having a program stored therein, the program causing a computer to function as a control section configured to cause a sound output section to output sound in a case where it is determined that an operation is performed on an input section by a target object coming into contact with a contact region, the input section having the contact region touched by the target object, wherein the control section adjusts a loudness peak as a control parameter for performing control in such a manner that the sound output section outputs the sound, the loudness peak being a maximum value of loudness indicating intensity of the sound, wherein the control section adjusts the loudness peak by adjusting a frequency of the sound output by the sound output section, and wherein
 the control section adjusts the loudness peak and a sharpness peak as control parameters,
 the sharpness peak is a maximum value of sharpness indicating sharpness of the sound,
 an adjustment for increasing the loudness is achieved by increasing intensity of sound of frequency that falls within a human hearing range, and
 an adjustment for decreasing the loudness is achieved by decreasing the intensity of sound of frequency that falls within the human hearing range.

* * * * *